United States Patent

Kobayashi et al.

[11] Patent Number: 5,352,337
[45] Date of Patent: Oct. 4, 1994

[54] METHOD FOR REDUCING NITROGEN OXIDES

[75] Inventors: Tetsuro Kobayashi; Kazuo Kawahara; Katsushi Abe; Kiyoshi Yamazaki; Tomoko Iijima; Koji Yokota; Haruo Doi; Hiroyasu Iwahara, all of Aichi, Japan

[73] Assignee: Kabushiki Kaisha Toyota Chuo Kenkyusho, Aichi, Japan

[21] Appl. No.: 45,692

[22] Filed: Apr. 14, 1993

[30] Foreign Application Priority Data

Apr. 14, 1992 [JP] Japan .................................. 4-121311
Mar. 24, 1993 [JP] Japan .................................. 5-90772
Mar. 24, 1993 [JP] Japan .................................. 5-90773

[51] Int. Cl.$^5$ .............................................. C25B 1/00
[52] U.S. Cl. .............................................. 204/59 R
[58] Field of Search ............ 204/101, 129, 128, 59 R, 204/290 R, 291

[56] References Cited

U.S. PATENT DOCUMENTS 4,253,925  3/1981  Mason ................................. 204/129

FOREIGN PATENT DOCUMENTS 3644090  7/1988  Fed. Rep. of Germany .
2333558  7/1977  France .

OTHER PUBLICATIONS

Patent Abstracts of Japan, vol. 16, No. 512 (C-0998), Oct. 22, 1992, JP-A-4190830, Jul. 9, 1992.

Primary Examiner—Kathryn Gorgos
Attorney, Agent, or Firm—Oblon, Spivak, McClelland, Maier & Neustadt

[57] ABSTRACT

A direct current voltage is applied between an anodic portion containing an oxidizing catalyst provided on one surface of a proton conductive solid electrolyte which separates the flow path of the gas to be treated into two parts, and a cathodic portion containing a reducing catalyst provided on the other surface of the solid electrolyte, the reducing catalyst comprising at least one selected from oxides of elements of Group 5A, Group 6A, and Group 7A of the periodic table, palladium, palladium alloys, transition elements carried on alumina, cerium oxide, and $La_{1-x}Sr_xCo_{1-y}Fe_yO_3$ (where, $0 \leq x \leq 1$, $0 \leq y \leq 1$), while bringing a gas containing water vapor into contact with the anodic portion and bringing a gas containing nitrogen oxides into contact with the cathodic portion. As a result, the water vapor is electrolytically oxidized into protons and oxygen on the anodic portion, so that the protons having been transported to the cathodic portion can be utilized to reduce nitrogen oxides by the reducing power of hydrogen. The method efficiently reduces nitrogen oxides in a gas even under an oxidizing atmosphere.

27 Claims, 5 Drawing Sheets

METHOD FOR REDUCING NITROGEN OXIDES

BACKGROUND OF THE INVENTION

1. Field of the Invention

The present invention relates to a method for reducing nitrogen oxides from exhaust gases which are discharged from internal combustion engines, burners, nitric acid production plants, etc.

2. Description of the Related Art

The exhaust gases which are discharged from internal combustion engines of automobiles, burners, nitric acid production plants, etc., contain acidic components such as nitrogen oxides (NOx), and are said to be the main cause of air pollution. Accordingly, methods for reducing nitrogen oxides are studied from various standpoints.

Conventional methods of reducing nitrogen oxides include various processes using catalysts. Among such processes, a process comprises adsorbing nitrogen oxides with a catalyst and simultaneously decomposing the adsorbed nitrogen oxides into nitrogen and oxygen, and then allowing the thus obtained oxygen to react with reducing substances such as carbon monoxide, hydrogen, and ammonium gas being incorporated in the atmosphere. In short, the process comprises reducing nitrogen oxides by using those reducing substances. The catalysts used in the processes are those comprising noble metals such as palladium, platinum, and rhodium, being carried on a porous carrier such as of alumina.

However, the aforementioned reducing methods suffer from a decrease in nitrogen oxide reduction under an oxidizing atmosphere; i.e., under atmospheric conditions in which no reducing substances such as carbon monoxide, hydrogen, and ammonia gas are present, or in which an excess amount of oxygen is incorporated. Under such atmospheric conditions of low concentration of reducing substances, the oxygen having been produced by decomposition of nitrogen oxides remains without being consumed, and even if a reducing substance may be present, the substance reacts preferentially with oxygen being present in excess, which prevents effective reduction of nitrogen oxides.

In exhaust gases from an automobile, for example, the amount of oxygen increases with the increase in the ratio of air to fuel (air-fuel ratio) and it exceeds the amount of oxygen necessary for complete combustion of the unburned components. Similarly to the aforementioned state of excess oxygen, nitrogen oxides can no longer be reduced under such a state.

In the light of such circumstances, one of the present inventors has studied a method for efficiently reducing nitrogen oxides in an oxidizing atmosphere to establish a method as disclosed in Japanese Laid-Open Patent Publication No. 190830/1992. The method comprises bringing a gas to be treated containing water vapor and nitrogen oxides into contact with a proton conductive solid electrolyte having an anodic portion and a cathodic portion on the surface thereof. According to this method, the proton is generated on the anodic portion by electrolytic oxidation of water vapor, while the proton thus generated is moved to the cathodic portion to be evolved thereon as hydrogen. The resulting hydrogen is used for reducing and removing the nitrogen oxides being incorporated in the gas to be treated. The cathodic portion contains reducing catalysts such as CuO, CoO, and Cu-ion exchanged zeolites to accelerate reduction of nitrogen oxides.

Although the method above enables reduction of nitrogen oxides even under an oxidizing atmosphere, the present day concern on environmental problems such as of exhaust gases demands a further increase in efficiency for reducing nitrogen oxides in an oxidizing atmosphere.

SUMMARY OF THE INVENTION

An object of the present invention is to overcome the technological problems above, and to provide a method of reducing nitrogen oxides in an oxidizing atmosphere efficiently.

The present invention provides, accordingly, a method for reducing nitrogen oxides being present in the gas to be treated by:

applying a direct current (DC) voltage between an anodic portion containing an oxidizing catalyst provided on one surface of a proton conductive solid electrolyte (which separates the flow path of the gas to be treated into two parts)to face one flow path, and a cathodic portion containing a reducing catalyst provided on the other surface of the proton conductive solid electrolyte to face the other flow path, the reducing catalyst comprising at least one selected from oxides of elements of Group 5A, Group 6A, and Group 7A of the periodic table, palladium, palladium alloys, transition elements carried on alumina, cerium oxide, and $La_{1-x}Sr_xCo_{1-y}Fe_yO_3$ (where, $0 \leq x \leq 1$, $0 \leq y \leq 1$), so as to electrolytically oxidize the water vapor on the anodic portion in one of the flow paths; and transporting protons obtained as a result to the cathodic portion through the solid electrolyte based on the potential gradient, thereby reducing the nitrogen oxides within the other flow path by taking advantage of the reducing power of hydrogen brought to the cathodic portion.

By the method of reducing nitrogen oxides according to the present invention, the water vapor which has passed through the anodic portion provided on one side of the proton conductive solid electrolyte is decomposed to produce protons at the boundary between the anodic portion and the solid electrolyte. The proton thus produced is transported through the solid electrolyte to the cathodic portion provided on the other side of the electrolyte and reduced into hydrogen at the boundary between the cathodic portion and the solid electrolyte. Because nitrogen oxides are adsorbed on the cathodic portion either as they are or as decomposed products, i.e., nitrogen and oxygen, the hydrogen having passed through the cathodic portion reacts with the nitrogen oxides or with the oxygen produced through decomposition to obtain nitrogen through a reduction process. In this manner, nitrogen oxides are reduced because oxygen is removed from nitrogen oxides.

The method according to the present invention enables reduction of nitrogen oxides at high efficiency in the gas to be treated. In particular, the method according to the present invention enables reduction of nitrogen oxides at high efficiency in an atmosphere containing reducing substances such as carbon monoxide and ammonia at low concentration, or in an oxidizing atmosphere containing oxygen in excess.

The method for reducing nitrogen oxides according to the present invention can be utilized in reducing nitrogen oxides in exhaust gases being discharged from internal combustion engines such as automobiles, nitric acid production plants, etc.

The above and other objects, features and advantages of the present invention will become more apparent from the following description when taken in conjunction with the accompanying drawings in which a preferred embodiment of the invention is shown by way of illustrative example.

DETAILED DESCRIPTION OF THE INVENTION

The present invention is explained in further detail below.

The method of reducing nitrogen oxides according to the present invention comprises applying a DC voltage between an anodic portion which contains an oxidizing catalyst, provided on one surface of a solid electrolyte and a cathodic portion which contains a reducing catalyst, provided on the other surface of a solid electrolyte to thereby generate proton on the anodic portion by electrolytic oxidation of water vapor, and then transporting the resulting proton to the cathodic portion to reduce nitrogen oxides by taking advantage of the reducing power of hydrogen having reached the cathodic portion.

The solid electrolyte for use in the present invention should function to first electrolyze water vapor in the gas to be treated flowing through the gas flow path to generate proton at the anodic portion, and then transfer the thus generated proton through the electrolyte to the cathodic portion. Specific examples of the solid electrolyte include sintered ceramics such as barium cerium oxide ($BaCeO_3$), strontium cerium oxide ($SrCeO_3$), strontium zirconium oxide ($SrZrO_3$), calcium zirconium oxide ($CaZrO_3$), and barium zirconium oxide ($BaZrO_3$). Such oxides preferably contain at least one of rare earth elements such as yttrium (Y), neodymium (Nd), ytterbium (Yb), scandium (Sc), and indium (In), and elements of Group 3B in the periodic table, as substituents for a part of Zn or Ce in the oxides.

The solid electrolyte is preferably shaped to a thickness of from 1 μm to 0.5 cm. If it is less than 1 μm in thickness, a dense solid electrolyte cannot be obtained. On the other hand, if it exceeds 0.5 cm in thickness, the proton conductivity of the solid electrolyte may decrease as to lower the reduction of nitrogen oxides. When there is difficulty in shaping the solid electrolyte thin enough, or in forming thereon electrodes which are referred to hereinafter, a solid electrolyte may be integrated with the electrode using a gas permeable reinforcing material as the base.

At least a pair of electrode portions comprising an anodic portion and a cathodic portion is formed on the surface of the solid electrolyte. Both of the anodic and cathodic portions should be porous, because the anodic portion must be water vapor permeable, and the cathodic portion must be hydrogen permeable, and impregnated with nitrogen oxides or nitrogen and oxygen which have generated therefrom through decomposition of the nitrogen oxides. The anodic and cathodic portions are placed in such a manner that they may not be brought into direct contact with each other. The anodic portion contains an oxidizing catalyst, and the cathodic portion contains a reducing catalyst.

Preferred materials for the anodic portion include those which are stable in an oxidizing atmosphere and have a high conductivity, such as platinum, $La_{1-x}Sr_xCrO_3$, $La_{1-x}Sr_xMnO_3$, $La_{1-x}Sr_xCoO_3$, $La_{1-x}Ca_xCrO_3$, $La_{1-x}Ca_xMnO_3$, and $La_{1-x}Ca_xCoO_3$ ($0 \leq x \leq 1$). They may be used alone or in admixture.

Preferred materials for the oxidizing catalyst of the anodic portion include metals having low oxygen overpotential such as platinum, rhodium, and iridium, and compounds thereof, used alone or in admixture. The anodic portion may be formed of the oxidizing catalyst alone.

Preferred materials for the cathodic portion include metals having low hydrogen overpotential such as platinum, ruthenium and palladium, and compounds thereof, used alone or in admixture.

Preferred materials for the reducing catalyst of the cathodic portion include materials capable of reducing nitrogen oxides, oxides of elements of Group 5A, Group 6A, and Group 7A of the periodic table, palladium, palladium alloys, transition elements carried on alumina, cerium oxide ($CeO_2$), and $La_{1-x}Sr_xCo_{1-y}Fe_yO_3$ ($0 \leq x \leq 1$, $0 \leq y \leq 1$), used alone or in admixture.

Further, platinum (Pt), palladium (Pd) and the like may be added to the reducing catalyst to increase the catalytic activity. As for the catalyst of $La_{1-x}Sr_xCo_{1-y}Fe_yO_3$, for example, palladium or platinum is preferably added in an amount of 0.2–10% by weight.

The reducing catalyst may be incorporated directly into the cathodic portion, or may be provided as a surface layer on the surface of the cathodic portion. Otherwise, the cathodic portion may be formed by the reducing catalyst alone.

The structure comprising the reducing catalyst as the surface layer of the cathodic portion is advantageous in aspects as follows.

It yields a high efficiency in reducing nitrogen oxides, because a large contact area can be assured between the nitrogen oxides and the reducing catalyst which is formed as a surface layer of the cathodic portion in the present invention. The amount of reduced nitrogen oxides increases with increasing hydrogen supply, and a higher efficiency for reducing the nitrogen oxides can be obtained by incorporating a large amount of catalysts and by enlarging the contact area (the area involved in the reaction) of the nitrogen oxides and the catalyst.

Furthermore, because the surface layer comprising the reducing catalyst can be formed separately from the cathodic portion, they may be designed independently. For instance, the cathodic portion may be designed as such that it may be utilized as an electrode for generating hydrogen, by imparting thereto sufficiently high conductivity and using a material having low hydrogen overpotential to obtain hydrogen at high efficiency consuming low electric power. On the other hand, the reducing efficiency for the nitrogen oxides can be ameliorated by increasing the contact area of the surface layer with the nitrogen oxides by incorporating a larger amount of catalysts or by increasing the porosity to a sufficiently high value.

The reducing catalysts for use in the present invention specifically include, as representative examples for oxides of elements of Group 5A, 6A, and 7A of the periodic table, vanadium oxide ($V_2O_5$), molybdenum oxide ($MOO_3$), tungsten oxide ($WO_3$), and manganese oxide ($MnO_2$). Representative examples for palladium and alloys thereof include a palladium-silver alloy (Pd-Ag). Any transition element may be used for catalysts with the transition element carried on the alumina. In particular, Mn, Fe, Co, Ni, and Cu of the first transition element group and Mo of the second transition element group yield higher efficiency in reducing nitrogen oxides. The highest reducing efficiency can be obtained with cobalt (Co). The preferred temperature range for reducing the nitrogen oxides differs from one transition element to another. For example, a catalyst carrying thereon Co or Ni is preferably used in the temperature range of from about 420° to 520° C. Preferred temperature range for one using Fe is from 380° to 480° C, that for using Cu is from 300° to 400° C., and those using Mn is from 460° to 560° C. Accordingly, an alumina Carrying thereon two or more transition elements above or other transition elements may be used for the purpose of extending the temperature range suited for reducing nitrogen oxides. The transition elements are preferably carried on the alumina substrate in an amount of from 0.1 to 5% by weight with respect to the alumina. Though not completely clarified, it is believed that the transition elements being carried on the alumina substrate partly form a solid solution with the alumina of the substrate to give a compound expressed by $MAl_2O_4$ (where M represents a transition element) which is effective for reducing nitrogen oxides. However, $MAl_2O_4$ in an excess amount reversely decreases the surface area for the reduction reaction to occur. Accordingly, the transition element is preferably carried in an amount defined above to prevent reduction efficiency from lowering.

The process for producing the catalyst comprising an alumina substrate carrying thereon a transition element is described below. A salt of the transition element, such as an acetate and nitrate, is dissolved into distilled water to obtain a solution, and an alumina powder is added therein and stirred. The alumina powder used here preferably is Γ-alumina having a large surface area. The solution thus obtained is evaporated to dryness while stirring, and dried. The resulting solid is then size reduced by crushing and calcined at 600° to 800° C. to obtain the final catalyst. Furthermore, the catalyst thus prepared is preferably subjected to heat treatment to accelerate production of $MAl_2O_4$ which is effective in reducing nitrogen oxides. This heat treatment is particularly effective where Co is used as the transition element. The heat treatment for the catalyst using Co as the transition element is preferably carried out in a helium gas flow or in air, at a temperature range of from 600° to 1000° C. for a duration of from 3 to 12 hours. If the heat treatment is carried out at a temperature lower than 600° C., $CoAl_2O_4$ would not form easily. If the heat treatment is to be carried out at a temperature higher than 1000° C., on the other hand, the alumina carrier undergoes phase transition from the Γ-phase to α-phase to reduce the surface area. This leads to a lower reduction efficiency for the nitrogen oxides.

In the embodiment above placing the reducing catalyst as the surface layer of the cathodic portion, the surface layer preferably has a porosity of from about 50 to about 90%. Such a surface layer is preferred because it facilitates the permeation of hydrogen which has generated at the cathodic portion and nitrogen oxides, or nitrogen and oxygen which have generated on decomposition of nitrogen oxides, and because it provides a large area for the contact of the gas containing nitrogen oxides with the reducing catalysts.

The surface layer is preferably provided at a thickness of from 0.1 to 2.0 mm. From the viewpoint of increasing the contact area of the nitrogen oxides with the catalysts, a thicker surface layer seems to be preferred. Under an oxidizing atmosphere, however, the nitrogen oxides can be hardly reduced by simply supplying hydrogen gas to the reducing catalyst unless a proton conductive solid electrolyte is used. That is, hydrogen which effectively functions in the reduction of nitrogen oxides is such obtained immediately after reduction of protons into hydrogen gas at the vicinity of the cathodic portion. It can be seen therefrom that even if a thicker surface layer were to be established, the reduction of nitrogen oxides rarely occurs within the surface layer at positions distant from the cathodic portion.

The surface layer may be formed, for example, by providing spacings from 0.1 to 2.0 mm in width on the upper side of the cathodic portion and then charging therein the reducing catalysts, or by preparing a paste using turpentine oil and the like (alumina sol and the like in case of an alumina-based catalysts) with the reducing catalyst, then applying the resulting paste to the cathodic portion, and baking the applied paste at a temperature in the range of from 600° to 1,000° C.

The electrode portions, i.e., the anodic portion and the cathodic portion exclusive of the surface layer in an embodiment comprising the reducing catalysts as the surface layer, are provided by first coating or printing the surface of the solid electrolyte with a paste for forming the electrode, and then calcining the coated or printed surface. Otherwise, they may be deposited by processes such as sputtering, vapor deposition, and plating. The electrode portions as above are preferably provided at a thickness of from 0.2 to 1,000 μm.

Furthermore, the specific surface area of the electrode portions or the stack number of the solid electrolyte equipped with electrodes is increased as possible to improve the contact of the electrode portions with the gas to be treated which is flown through the flow path.

The flow path of the gas to be treated is arranged in such a manner that the gas containing water vapor at a high concentration may be supplied to the anodic portion and that the gas enriched with nitrogen oxides is brought into a better contact with the cathodic portion.

The DC voltage is applied to the electrode portions by, for example, connecting the electrodes of a battery or a DC power supply to the respective electrode portions. Otherwise, the electromotive force attributed to the difference of water vapor pressures may be utilized.

The method for applying a DC voltage to the electrode portions using the electromotive force making use of the difference of water vapor pressures is described below.

In an apparatus comprising a proton conductive solid electrolyte as a partition which defines two gas chambers, i.e., one provided with a gas flow containing water vapor at a high concentration and the other with a gas flow containing water vapor at a low concentration, an electromotive force can be generated on making a short circuit between the electrodes (anode and cathode) by the difference of water vapor pressures according to eq. (1) as follows $$E = \frac{RT}{2F} \ln\left[\frac{P_{H2O}(I)}{P_{H2O}(II)}\right] \times \left[\frac{P_{O2}(II)}{P_{O2}(I)}\right]^{\frac{1}{2}} \quad (1)$$

where E represents electromotive force; R represents gas constant; T represents absolute temperature; F represents Faraday constant; $P_{H2O}(I)$ represents the water vapor partial pressure of the anodic portion; $P_{H2O}(II)$ represents the water vapor partial pressure of the cathodic portion; $P_{O2}(I)$ represents the oxygen partial pressure of the anodic portion; and $P_{O2}(II)$ represents the oxygen partial pressure of the cathodic portion. The oxygen partial pressure (PO2) in eq.(1) means a partial pressure of oxygen gas contained in the gas to be treated, and a partial pressure corresponding to chemical potential of oxygen generated by dissociation of nitrogen oxides and water vapor on the catalyst. The methods for making a short circuit between the both electrodes include circuit connection by use of lead wires from the electrodes, or use of a solid electrolyte having an electric conductivity. For example, the use of $SrCe_{0.95}Yb_{0.05}O_{3-a}$ (a means an amount of oxygen loss) as a material for the solid electrolyte, sometimes causes the formation of cerium oxide which is electrically conductive. $SrCe_{0.95}Yb_{0.05}O_{3-a}$ containing cerium oxide functions like a mixed electric conductor having both electrons and protons as carriers.

However, a higher efficiency in reducing nitrogen oxides can be achieved by connecting the electrode portions to the respective electrodes of a battery or a DC power source.

The method utilizing the electromotive force attributed to the difference in water vapor pressures is advantageous in that it does not require an additional battery or a DC power source to be connected to the electrode portions. However, the path of the gas flow must be separated into two gas chambers. In contrast to this, the methods using a battery or a DC power source need not two separated gas chambers, and a gas containing water vapor and nitrogen oxides may be supplied to both of the anodic and cathodic portions.

In the method according to the present invention, the DC voltage is preferably applied as such that the current may be supplied at from 5 to 300 $mA/cm^2$ per unit area of the electrode portions. If the current density were to be lower than 5 $mA/cm^2$, hydrogen is insufficiently supplied to the cathodic portion; if the current density were to be higher than 300 $mA/cm^2$, on the other hand, the solid electrolyte suffers rapid deterioration. However, even under a current density of 300 $mA/cm^2$ or lower, the solid electrolyte may in some cases be impaired depending on the voltage. Accordingly, the voltage is preferably applied at 5 V or lower.

Furthermore, the efficiency in reducing nitrogen oxides is sometimes lowered when the temperature of the gas to be treated is too low, because the proton conductivity of the solid electrolyte becomes small. In such cases, the apparatus for reducing the nitrogen oxides or the gas to be treated is preferably heated using a heating means to, preferably, a temperature range of from 300° to 700° C.

The present invention is illustrated in greater detail referring to non-limiting examples below. It should be understood, however, that the present invention is not to be construed as being limited thereto.

EXAMPLE 1

Figure 1:
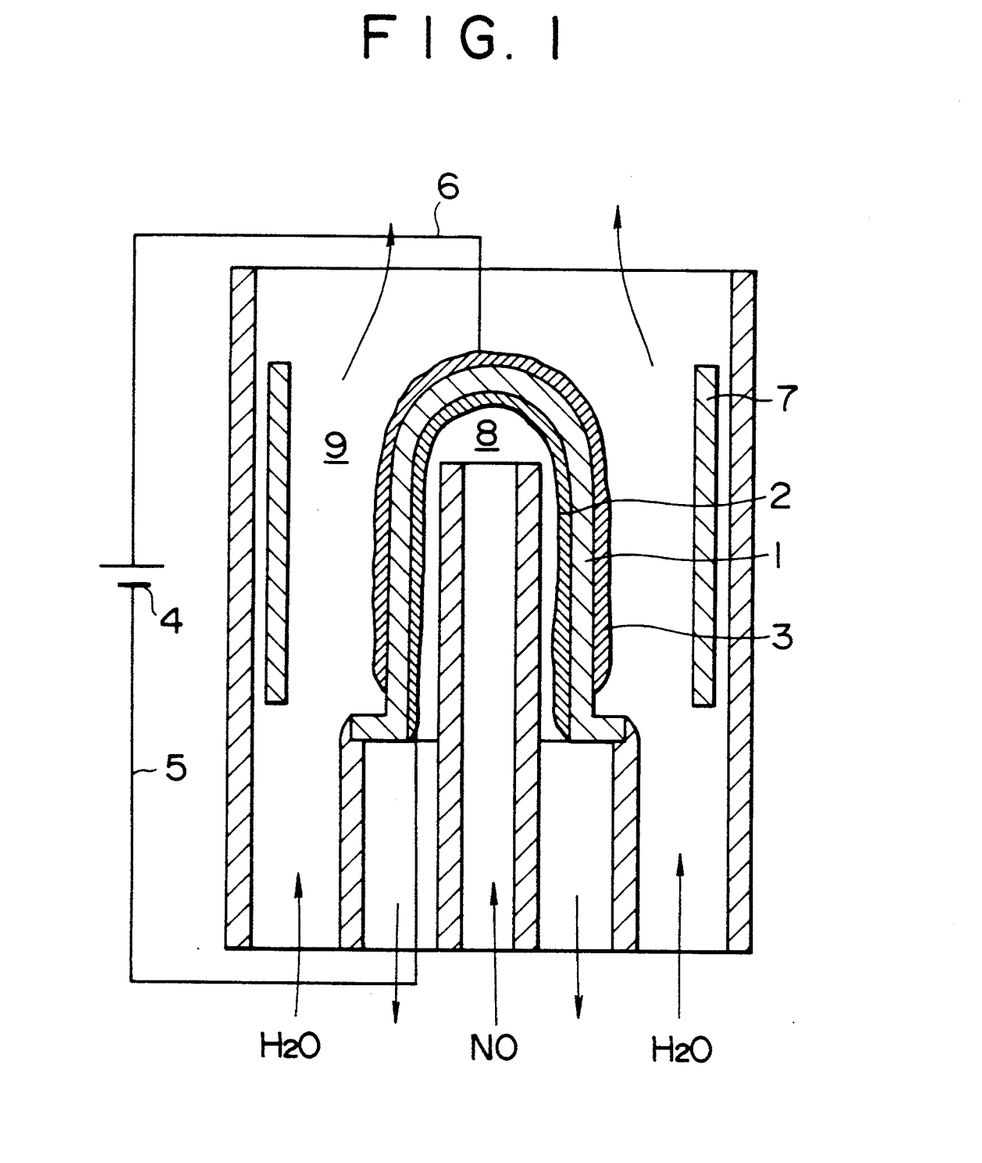
FIG. 1 is a cross sectional view of an apparatus for reducing nitrogen oxides according to Examples 1 to 5 of the present invention.

FIG. 1 is a cross sectional view of an apparatus for reducing nitrogen oxides which was used in the present example. Referring to FIG. 1, the apparatus comprises two chambers having a cylindrical solid electrolyte 1 with a bottom as the partition. A gas to be treated containing nitrogen oxides is introduced into one (cathodic chamber 8) of the chambers, and water vapor is supplied to the other (anodic chamber 9) chamber.

Referring to the apparatus of the present example, a cathodic portion 2 containing a reducing catalyst for reducing nitrogen oxides is provided on one surface of the solid electrolyte 1 to face the cathodic chamber 8, whereas an anodic portion 3 containing an oxidizing catalyst for decomposing water vapor is provided on the other surface to face the anodic chamber 9.

The opening of the cathodic chamber 8 is further sectioned in two parts, so that the gas to be treated may be introduced through one part and that the treated gas may be ejected from the other.

The DC voltage is applied to both of the electrodes from a DC power source 4 via platinum lead wires 5 and 6.

The apparatus for use in the present example is further equipped with a heater 7 for heating, so that the solid electrolyte 1 and the gas to be treated may be heated.

The solid electrolyte 1 used herein was 0.1 cm in thickness, which had been prepared from a powder of ytterbium-doped strontium cerium oxide ($SrCeO_3$), i.e., $SrCe_{0.95}Yb_{0.05}O_{3-a}$ (where, a represents the oxygen vacancy), containing 5 at % ytterbium ($Yb^{3+}$).

The reducing catalyst for use in the cathodic portion 2 was obtained by using each of the pastes of molybdenum oxide ($MoO_3$), tungsten oxide ($WO_3$), and palladium-25% silver (Pd-25%Ag) alloy. Each of the pastes was applied to the electrode portion and calcined to obtain an electrode about 10 $\mu$m in thickness and about 10 $cm^2$ in area. Furthermore, a 10 $\mu$m thick platinum catalyst layer was formed on the cathodic portion by plating. The anodic and cathodic portions were both porous.

The procedure of reducing nitrogen oxides using the present apparatus is described below.

Nitrogen ($N_2$) gas containing 1% nitrogen monoxide (NO) and 0.8% oxygen ($O_2$) was supplied to the cathodic chamber 8 (the cathodic portion 2 of the solid electrolyte 1) while heating the apparatus to 680° C. using a heater 7, whereas nitrogen gas containing 20% or less water vapor was supplied to the anodic chamber 9 (the anodic portion 3), each at a flow rate of 60 ml/min and applying a DC voltage of 1.2 V between both of the electrodes. A current at a density of 8 mA per 1 $cm^2$ area of the electrode flowed at this point, and 0.6 ml/min of hydrogen gas (at an $H_2$/NO ratio of 1) was generated on the cathodic portion. The amount of NO contained in the gas discharged from the outlet of the cathodic chamber 8 was measured to obtain the NO reduction achieved by the present apparatus. The results are given in Table 1.

TABLE 1

| Reducing Catalyst | Solid Electrolyte | NO Reduction | $O_2$ Reduction |
| --- | --- | --- | --- |
| $WO_3$ | $H^+$ Conductor[1)] | 41% | 42% |
| $MoO_3$ | $H^+$ Conductor[1)] | 40% | 43% |
| Pd—25%Ag | $H^+$ Conductor[1)] | 42% | 47% |
| Pt (Comp. 1) | $H^+$ Conductor[1)] | 5% | 73% |
| $WO_3$ (Com. 2) | $O^{2-}$ Conductor[2)] | 0 | 0 |

[1)]$H^+$ Conductor: $SrCe_{0.95}Yb_{0.05}O_{3-\alpha}$
[2)]$O^{2-}$ Conductor: $(ZrO_2)_{0.92}(Y_2O_3)_{0.08}$ Furthermore, the same procedure of Example 1 was conducted to obtain the NO reduction as Comparative Example 1 using the same apparatus for reducing nitrogen oxides, except for plating a surface of the solid electrolyte with platinum as a reducing catalyst to form the porous cathodic portion 2. Also, as Comparative Example 2, the same procedure of Example 1 was conducted except for using an oxygen ion conductive stabilized zirconia $(ZrO_2)_{0.92}(Y_2O_3)_{0.08}$ as the solid electrolyte in the place of proton conductor, having provided thereon a porous $WO_3$ layer as the cathodic portion and a porous Pt layer as the anodic portion. The results of NO reduction thus obtained in Comparative Examples 1 and 2 are shown also in Table 1. It can be seen from the results in Table 1 that the method according to the present invention enables reduction of nitrogen oxides at high efficiency even under an oxidizing atmosphere containing no reducing substances.

EXAMPLE 2

Nitrogen monoxide in the gas to be treated was reduced in a procedure similar to that of Example 1, except for introducing nitrogen ($N_2$) gas containing 1% of nitrogen monoxide (NO), 0.8% of oxygen ($O_2$), and 20% of water vapor into both of the electrode chambers. As a result, NO could be reduced at high efficiency comparable to those obtained in Example 1.

EXAMPLE 3

Nitrogen monoxide in the gas to be treated was reduced in a procedure similar to that of Example 1, except for using the materials shown in Table 2 as the reducing catalysts of the cathodic portion and the porous cathodic portion as well at a reaction temperature of 460° C., nitrogen monoxide (NO) concentration of 1,000 ppm and oxygen ($O_2$) concentration of 8%, a current density of 2.4 mA/cm$^2$ and at an amount of generated hydrogen of 0.18 ml/min (at an $H_2$/NO ratio of 3).

The reducing catalyst (also serving as the porous cathodic portion) of sample No. 3-1 as shown in Table 2 was prepared by a process as follows. Cobalt acetate was dissolved in about 200 ml of distilled water, into which 20 g of alumina (y-$Al_2O_3$) powder was added and stirred for about 3 hours. After evaporating water to dryness while stirring, the resulting solid was dried for one day at 110° C. The dry product thus obtained was ground in a mortar, and then calcined in air at 600° C. for a duration of 3 hours to obtain a Co-on-alumina (Co/$Al_2O_3$) catalyst. The resulting catalyst was subjected to heat treatment at 800° C. for 5 hours. The green black colored initial Co/$Al_2O_3$ became blue color after the heat treatment. The blue colored Co/$Al_2O_3$ catalyst was mixed with a Pt paste. The paste thus obtained was applied to a solid electrolyte and calcined at 800° C. to obtain a porous cathode portion. The Co/$Al_2O_3$ after calcining accounted for 17% by weight.

The reducing catalyst for Sample No. 3-2 was a mixture comprising 28% by weight of $WO_3$ and 72% by weight of Pt; that for Sample No. 3-3 was $La_{0.8}Sr_{0.2}CoO_3$ having added therein 0.2% by weight of Pd; that for Sample No. 3-4 was a mixture comprising 28% by weight of $CeO_2$ and 72% weight of Pt. They were all prepared into porous cathodic portions.

Furthermore, a mixture comprising 24% by weight of CuO and 76% by weight of Pt was used for the reducing catalyst in Comparative Example 3, and an alloy containing 50% by atomic of each of Pt and Rh was used in Comparative Example 4. They were both prepared into porous cathodic portions, and were used in reducing NO under the same conditions above.

The results thus obtained are listed in Table 2 below.

TABLE 2

| Sample No. | Reducing Catalyst | NO Reduction |
| --- | --- | --- |
| 3-1 | Co/$Al_2O_3$ + Pt | 90% |
| 3-2 | $WO_3$ + Pt | 6% |
| 3-3 | Pd/$La_{0.8}Sr_{0.2}CoO_3$ | 15% |
| 3-4 | $CeO_2$ + Pt | 20% |
| Comp. Ex. 3 | CuO + Pt | 3% |
| Comp. Ex. 4 | Pt—Rh | 0 |

Table 2 reads clearly that the method according to the present invention enables reduction of nitrogen oxides at high efficiency even under an oxidizing atmosphere containing no reducing substances.

EXAMPLE 4

Sample No. 3-1 in Table 2 was formed into a porous cathodic portion, and the same procedure as that in Example 3 was conducted to reduce NO from an object gas, except for varying the electrolytic current density in the range of from 0 to 1.6 mA/cm$^2$ and the amount of generated hydrogen in the range of from 0 to 0.12 ml/min (at an $H_2$/NO ratio of from 0 to 2). The results are shown in FIG. 2.

Figure 2:
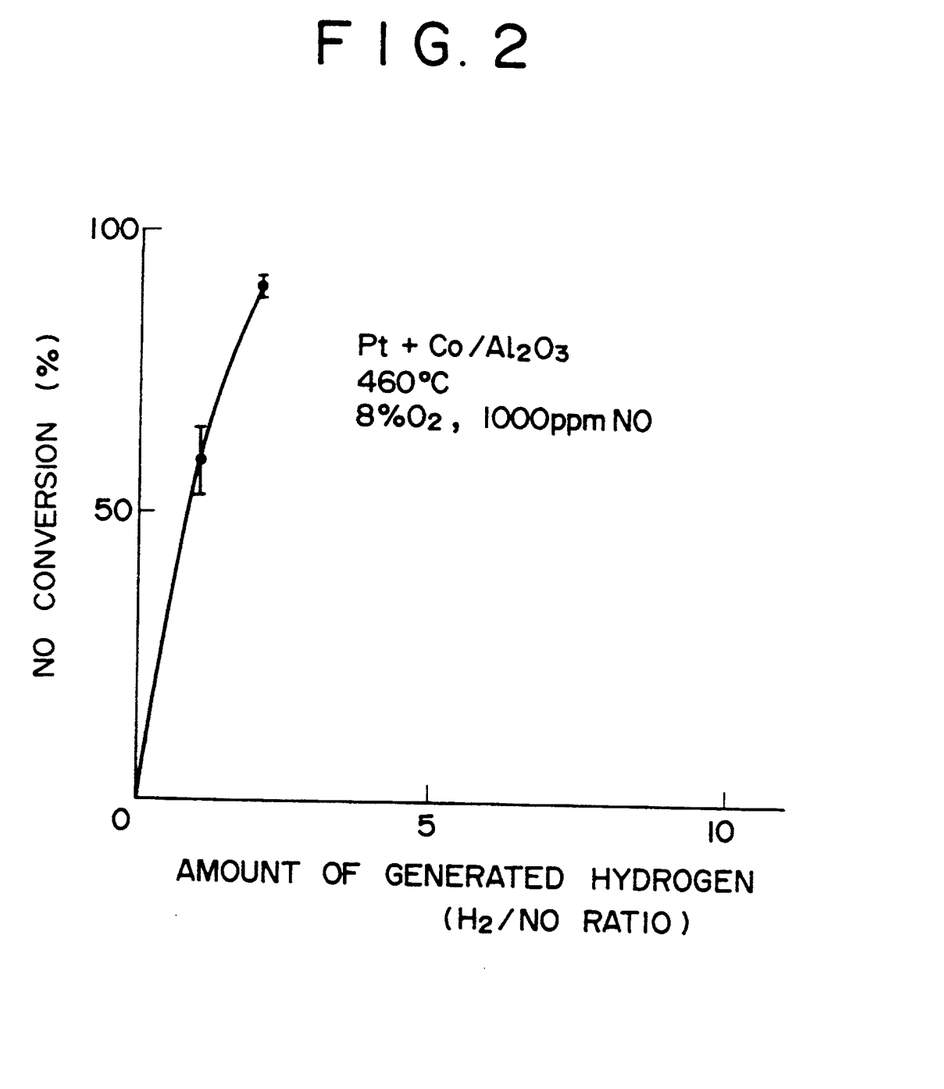
FIG. 2 is a graph showing the efficiency of reducing nitrogen oxides according to Example 4 of the present invention.

FIG. 2 reads clearly that a higher efficiency in reducing or converting nitrogen oxides is obtained with increasing amount of generated hydrogen.

EXAMPLE 5

Sample No. 3-1 in Table 2 was formed into a porous cathodic portion, and the same procedure as that in Example 3 was conducted to reduce NO in an object gas, except for varying the reaction temperature in the range of from 460° to 580° C. The results are shown in FIG. 3.

Figure 3:
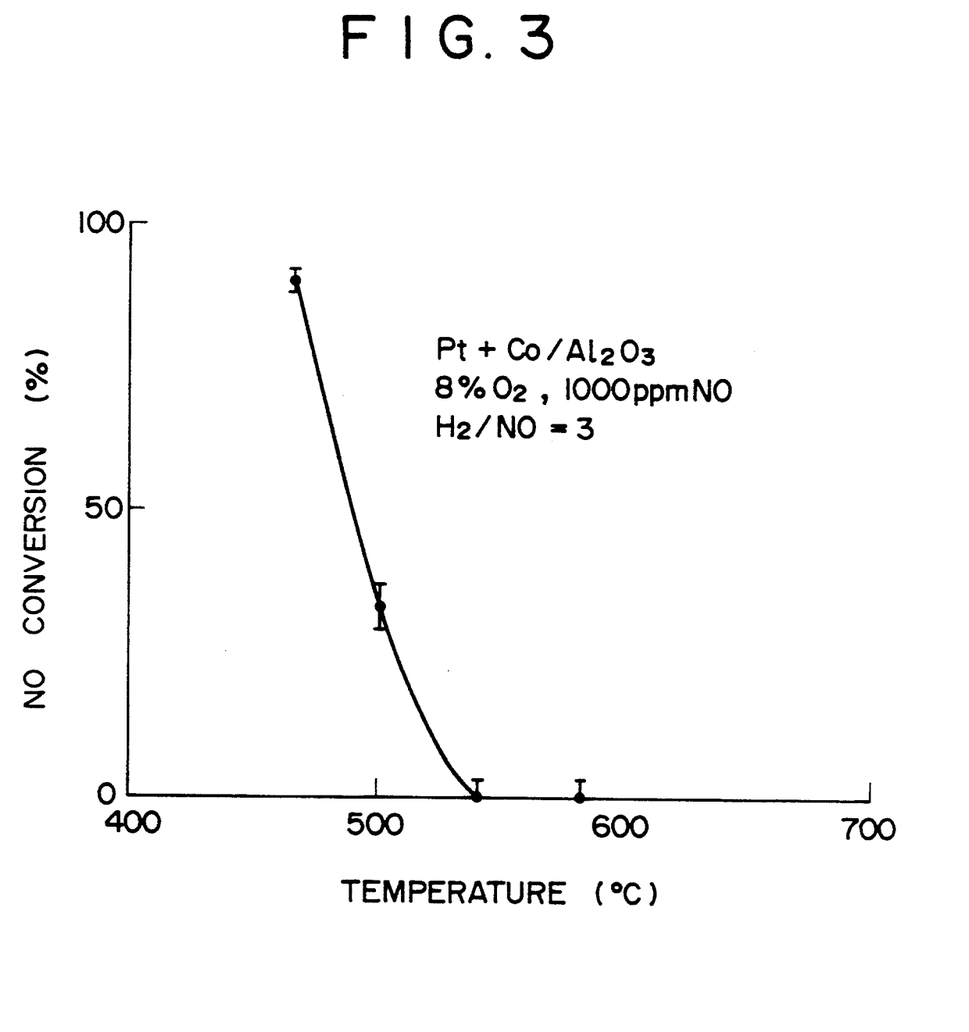
FIG. 3 is a graph showing the efficiency of reducing nitrogen oxides according to Example 5 of the present invention.

The results in FIG. 3 show that nitrogen oxides can be reduced efficiently at temperatures up to about 540° C. in the process according to the present invention.

EXAMPLE 6

Figure 4:
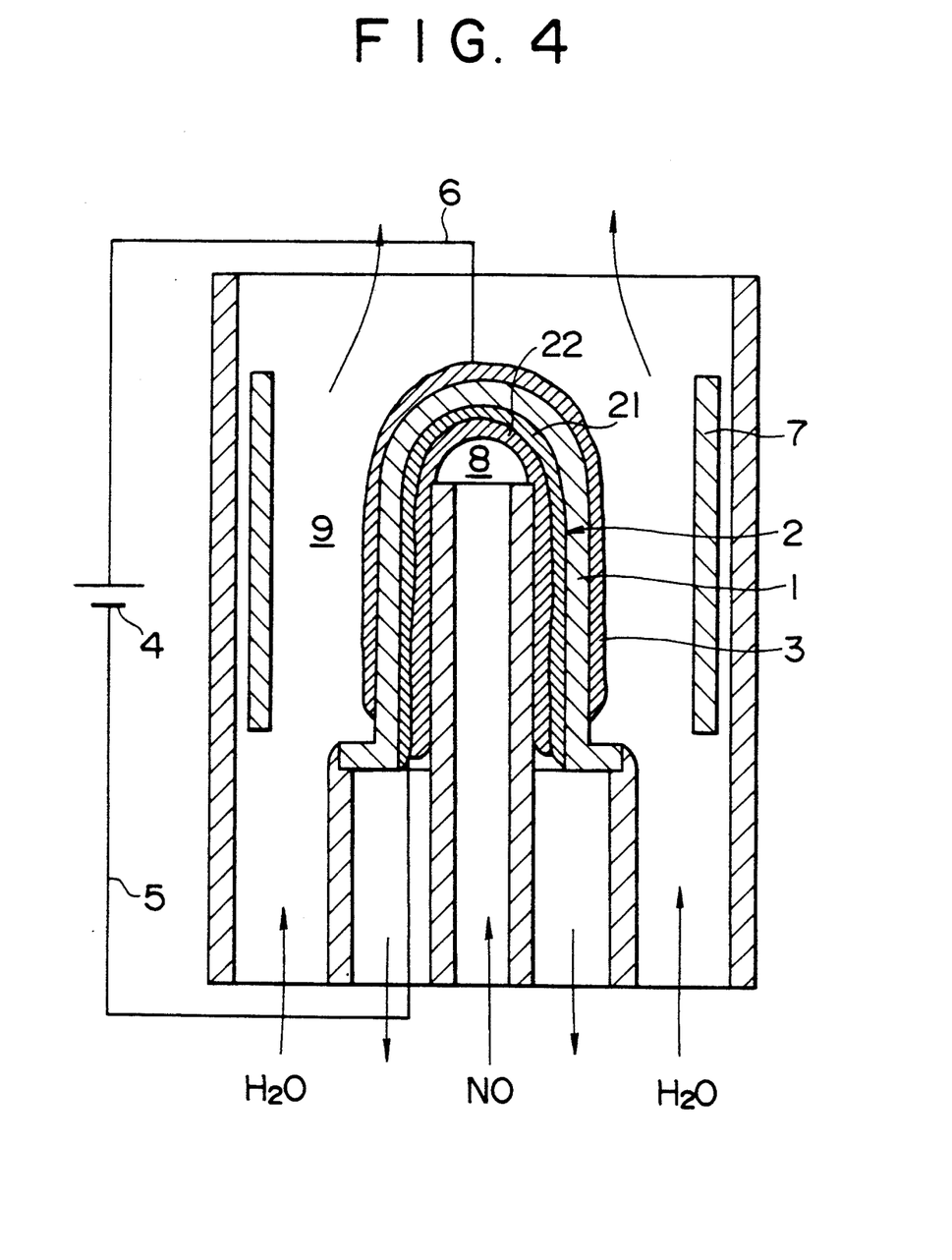
FIG. 4 is a cross sectional view of an apparatus for reducing nitrogen oxides according to Examples 6 to 8 of the present invention.

In FIG. 4 is shown a cross sectional view of an apparatus for reducing nitrogen oxides used in the present example. Referring to FIG. 4, the apparatus comprises two chambers having a cylindrical solid electrolyte 1 with a bottom as the partition. A gas to be treated containing nitrogen oxides can be introduced into one of the chambers (cathodic chamber 8), and water vapor can be supplied to the other chamber (anodic chamber 9).

Referring to the apparatus of the present example, a cathodic portion 2 comprising a cathodic portion base 21 and a surface layer 22 thereon containing a reducing catalyst for reducing nitrogen oxides is provided on the surface of the solid electrolyte 1 facing the cathodic chamber 8, whereas an anodic portion 3 containing an oxidizing catalyst for decomposing water vapor is provided on the surface facing the anodic chamber 9.

The opening of the cathodic chamber 8 is further sectioned in two parts, so that the gas to be treated may be introduced through one part and the treated gas may be ejected from the other.

The DC voltage is applied to both of the electrodes from a DC power source 4 via platinum lead wires 5 and 6.

The apparatus for use in the present example is further equipped with a heater 7 for heating, so that the solid electrolyte 1 and the gas to be treated may be heated.

The solid electrolyte 1 used herein was 0.1 cm in thickness, which had been prepared from a powder of ytterbium-doped strontium cerium oxide ($SrCeO_3$), i.e., $SrCe_{0.95}Yb_{0.05}O_{3-a}$, containing 5 at % ytterbium ($Yb^{3+}$).

The base 21 of the cathodic portion 2 was a platinum (Pt) conductor, which was prepared by making it into a paste, applying the resulting paste to the surface of the solid electrolyte, and calcining the resulting coating. Thus was obtained an electrode about 10 μm in thickness and about 10 $cm^2$ in area. Furthermore, a cobalt (Co) on alumina ($Al_2O_3$) catalyst ($Co/Al_2O_3$) was charged between a space about 1.5 mm in width between the gas inlet tube of the cathodic chamber 8 and the base 21 of the cathodic portion 2 of the solid electrolyte 1, to thereby establish a surface layer 22 as a reducing catalyst. The $Co/Al_2O_3$ catalyst used herein was prepared and subjected to heat treatment in the same manner as in the process of $Co/Al_2O_3$ catalyst employed in the Sample No. 3-1 as shown in Table 2 of Example 3.

Further, a 10 μm thick platinum catalyst layer was formed on the anodic portion 3 by plating. Both of the anodic and cathodic portions were porous.

The procedure of reducing nitrogen oxides using the present apparatus is described below.

Nitrogen ($N_2$) gas containing 1,000 ppm nitrogen monoxide (NO) and 8% oxygen ($O_2$) was supplied to the cathodic chamber 8 (the cathodic portion 2 of the solid electrolyte 1) while heating the apparatus to 450° C. using a heater 7, whereas nitrogen gas containing 20% or less water vapor was supplied to the anodic chamber 9 (the anodic portion 3), each at a flow rate of 60 ml/min and applying a DC voltage of 0.5 V between both electrodes. A current at a density of 0.8 mA per 1 $cm^2$ area of the electrode flowed at this point, and, 0.06 ml/min of hydrogen gas (at an $H_2$/NO ratio of 1) was generated on the cathodic portion. The amount of NO contained in the gas discharged from the outlet of the cathodic chamber 8 was measured to obtain the NO reduction achieved by the present apparatus. The results are given in Table 3, for Sample No. 6.

TABLE 3

| Sample No. | Cathodic Portion | Surface Layer | Base of Cathodic Portion | NO Reduction |
|---|---|---|---|---|
| 6 | Double-layer | $Co/Al_2O_3$ | Pt | 25% |

Table 3 reads clearly that the method according to the present invention enables reduction of nitrogen oxides at high efficiency even under an oxidizing atmosphere containing no reducing substances.

As a Comparative Example, reduction of nitrogen oxides was conducted using a reducing catalyst ($Co/Al_2O_3$ which was subjected to heat treatment) similar to that used in the present Example, except for using the catalyst alone as described below. An apparatus equipped with 0.12 mg of the aforementioned $Co/Al_2O_3$ catalyst was heated to a temperature range of from 440° to 680° C., and $N_2$ gas containing 1,000 ppm NO, 8% $O_2$, and 1,000 ppm $H_2$ was introduced therein at a flow rate of 60 ml/min. The NO content of the gas ejected from the outlet of the apparatus was measured to obtain the NO reduction. The results are shown in Table 4.

TABLE 4

| Sample No. | Supplied Gas Composition | Amount of $H_2$ Generated | Maximum NO Reduction |
|---|---|---|---|
| 6 | 8% $O_2$, 1000 ppm NO, bal. $N_2$ | 1000 ppm $H_2$ eqivalent | 25% |
| Comp. Ex. 5 | 8% $O_2$, 1000 ppm NO, 1000 ppm $H_2$, bal. $N_2$ | None | 2% |

It can be seen clearly from Table 4 that the present example yields a higher efficiency in reducing nitrogen oxides than the Comparative example 5. It can be understood that hydrogen having generated at the proton conductive solid electrolyte is effective for reducing nitrogen oxides.

EXAMPLE 7

Nitrogen monoxide in gas to be treated was reduced in a procedure similar to that of Example 6 using the cathodic portion of sample No. 6 in Table 3, except for changing the reaction temperature to 440° C., the electrolytic current density in the range of from 0 to 4.0 $mA/cm^2$, and the amount of generated hydrogen in the range of from 0 to 0.3 ml/min (at an $H_2$/NO ratio of from 0 to 5). The results are shown in FIG. 5.

Figure 5:
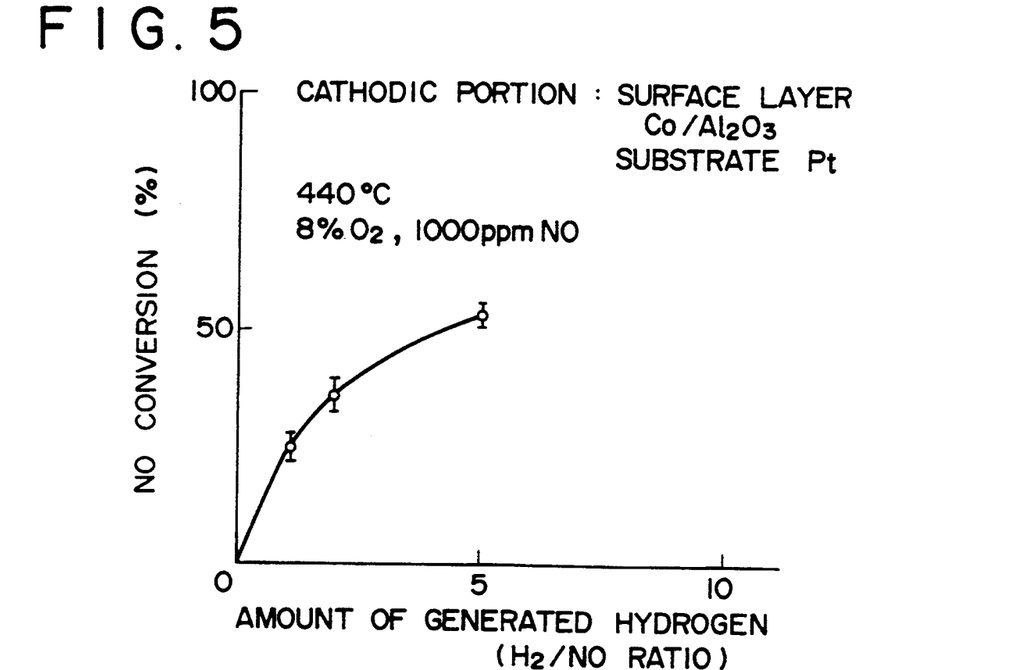
FIG. 5 is a graph showing the efficiency of reducing nitrogen oxides according to Example 7 of the present invention.

FIG. 5 reads clearly that a higher efficiency in reducing nitrogen oxides can be obtained with increasing amount of generated hydrogen.

EXAMPLE 8

Nitrogen monoxide in gas to be treated was reduced in a procedure similar to that of Example 6 using the cathodic portion of sample No. 6 in Table 3, except for changing the reaction temperature in the range of from 440° to 600° C., the electrolytic current density to 4.0 $mA/cm^2$ and the amount of generated hydrogen to 0.3 ml/min ($H_2$/NO ratio of 5). The results are shown in FIG. 6.

Figure 6:
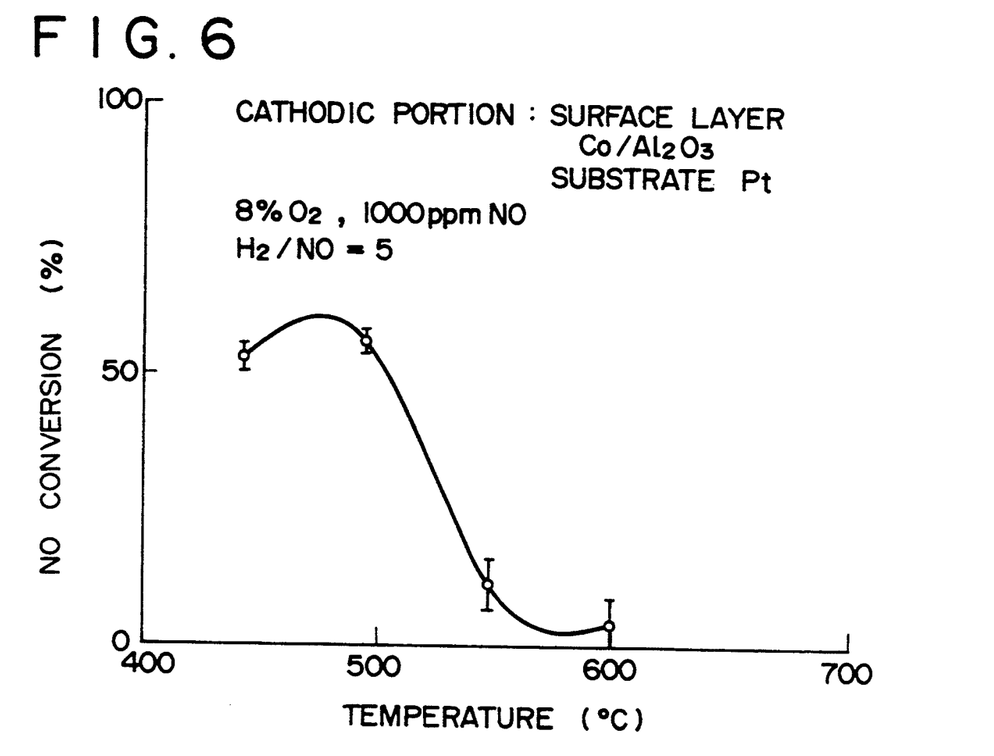
FIG. 6 is a graph showing the efficiency of reducing nitrogen oxides according to Example 8 of the present invention.

It can be seen from FIG. 6 that the present invention enables efficient reduction of nitrogen oxides at temperatures up to about 560° C.

While the invention has been described in detail and with reference to specific embodiments thereof, it will be apparent to one skilled in the art that various changes and modifications can be made therein without departing from the spirit and scope thereof.

What is claimed is:

1. A method for reducing nitrogen oxides in a gas to be treated which comprises:

applying a direct current (DC) voltage between an anodic portion comprising an oxidizing catalyst provided on one surface of a proton conductive solid electrolyte which separates the flow path of the gas to be treated into two parts, to face one flow path, and a cathodic portion comprising a reducing catalyst provided on the other surface of said proton conductive solid electrolyte to face the other flow path, said reducing catalyst comprising at least one member selected from the group consisting of oxides of elements of Group 5A, Group 6A, and Group 7A of the periodic table, palladium, palladium alloys, transition elements carried on alumina, cerium oxide, and $La_{1-x}Sr_xCo_{1-y}Fe_yO_3$ where, $0 \leq x \leq 1$, $0 \leq y \leq 1$), to electrolytically oxidize water vapor in said gas on said anodic portion in said one flow path; and transporting protons obtained as a result of said oxidation to said cathodic portion through said solid electrolyte based on the potential gradient, thereby reducing nitrogen oxides within the other flow path by using the reducing power of hydrogen brought to said cathodic portion.

2. A method for reducing nitrogen oxides as claimed in claim 1, wherein said cathodic portion contains said reducing catalyst in a base thereof.

3. A method for reducing nitrogen oxides as claimed in claim 2, wherein said cathodic portion is formed of said reducing catalyst alone.

4. A method for reducing nitrogen oxides as claimed in claim 2, wherein said cathodic portion has a thickness of from 0.2 to 1,000 μm.

5. A method for reducing nitrogen oxides as claimed in claim 1, wherein said cathodic portion contains said reducing catalyst as a layer thereon.

6. A method for reducing nitrogen oxides as claimed in claim 5, wherein said layer of the reducing catalyst has a porosity of from 50 to 90%.

7. A method for reducing nitrogen oxides as claimed in claim 5, wherein said layer of the reducing catalyst has a thickness of from 0.1 to 2.0 mm.

8. A method for reducing nitrogen oxides as claimed in claim 5, wherein said cathodic portion exclusive of said layer has a thickness of from 0.2 to 1,000 μm.

9. A method for reducing nitrogen oxides as claimed in claim 1, wherein said proton conductive solid electrolyte is at least one sintered ceramic selected from the group consisting of barium cerium oxide of the formula $BaCeO_3$, strontium cerium oxide of the formula $SrCeO_3$, strontium zirconium oxide of the formula $SrZrO_3$, calcium zirconium oxide of the formula $CaZrO_3$, and barium zirconium oxide of the formula $BaZrO_3$.

10. A method for reducing nitrogen oxides as claimed in claim 9, wherein said sintered ceramic contains at least one selected from the group consisting of rare earth elements and elements of Group 3B of the periodic table, which is substituted for a part of Zr or Ce in said oxides.

11. A method for reducing nitrogen oxides as claimed in claim 1, wherein said proton conductive solid electrolyte has a thickness of from 1 μm to 0.5 cm.

12. A method for reducing nitrogen oxides as claimed in claim 1, wherein said anodic portion is formed of at least one material selected from the group consisting of platinum, $La_{1-x}Sr_xCrO_3$, $La_{1-x}Sr_xMnO_3$, $La_{1-x}Sr_xCoO_3$, $La_{1-x}Ca_xCrO_3$, $La_{1-x}Ca_xMnO_3$, and $La_{1-x}Ca_xCoO_3$ where $0 \leq x \leq 1$.

13. A method for reducing nitrogen oxides as claimed in claim 1, wherein said oxidizing catalyst comprises at least one selected from the group consisting of platinum, rhodium, and iridium.

14. A method for reducing nitrogen oxides as claimed in claim 1, wherein said cathodic portion is formed of at least one material selected from the group consisting of platinum, ruthenium, and palladium.

15. A method for reducing nitrogen oxides as claimed in claim 1, wherein said reducing catalyst comprises at least one material selected from the group consisting of vanadium oxide of the formula $V_2O_5$, molybdenum oxide of the formula $MoO_3$, tungsten oxide of the formula $WO_3$, manganese oxide of the formula $MnO_2$, and palladium-silver alloys.

16. A method for reducing nitrogen oxides as claimed in claim 1, wherein said transition element carried on alumina is at least one selected from the group consisting of manganese (Mn), iron (Fe), cobalt (Co), nickel (Ni), and copper (Cu).

17. A method for reducing nitrogen oxides as claimed in claim 1, wherein said transition element is carried on alumina in an amount of from 0.1 to 5% by weight with respect to said alumina.

18. A method for reducing nitrogen oxides as claimed in claim 1, wherein said cerium oxide or said $La_{1-x}Sr_xCo_{1-y}Fe_yO_3$ is added with from 0.2 to 10% by weight of palladium.

19. A method for reducing nitrogen oxides as claimed in claim 1, wherein said anodic portion has a thickness of 20. A method for reducing nitrogen oxides as claimed in claim 1, wherein the direct current voltage is applied by connecting the electrodes of a battery or a direct current power supply to each of the anodic and the cathodic portions, or by utilizing the electromotive force generated due to the difference of water vapor pressures.

21. A method for reducing nitrogen oxides as claimed in claim 1, wherein said direct current voltage is applied to the anodic and the cathodic portions at a current density of from 5 to 300 mA/cm$^2$.

22. A method for reducing nitrogen oxides as claimed in claim 1, wherein said direct current voltage is applied at 5 V or lower per single cell.

23. A method for reducing nitrogen oxides as claimed in claim 1, which further comprises heating an apparatus and said gas to be treated for reducing nitrogen oxides to a temperature range of from 300° to 700° C.

24. A method for reducing nitrogen oxides as claimed in claim 1, wherein said reducing catalyst comprises at least one member selected from the group consisting of oxides of elements of Group 5A, Group 6A, and Group 7A of the periodic table, palladium and palladium alloys.

25. A method for reducing nitrogen oxides as claimed in claim 1, wherein said reducing catalyst comprises $La_{1-x}Sr_xCo_{1-y}Fe_yO_3$ where $0 \leq x \leq 1$ and $0 \leq y \leq 1$.

26. A method for reducing nitrogen oxides as claimed in claim 1, wherein said reducing catalyst comprises cerium oxide.

27. A method for reducing nitrogen oxides in a gas to be treated which comprises:

applying a direct current (DC) voltage between an anodic portion comprising an oxidizing catalyst provided on one surface of a proton conductive solid electrolyte which separates the flow path of the gas to be treated into two parts, to face one flow path, and a cathodic portion comprising a reducing catalyst provided on the other surface of said proton conductive solid electrolyte to face the other flow path, said reducing catalyst comprising at least one member selected from the group consisting of oxides of elements of Group 5A, Group 6A, and Group 7A of the periodic table, palladium, palladium alloys, transition elements carried on alumina, cerium oxide, and $La_{1-x}Sr_xCo_{1-y}Fe_yO_3$ where $0 \leq x \leq 1$ and $0 \leq y \leq 1$, and supplying water vapor to said anodic portion so as to electrolytically oxidize said water vapor on said anodic portion in said one flow path; and transporting protons obtained as a result of said oxidation to said cathodic portion through said solid electrolyte based on the potential gradient, thereby reducing nitrogen oxides within the other flow path by using the reducing power of hydrogen brought to said cathodic portion.

* * * * *

UNITED STATES PATENT AND TRADEMARK OFFICE
CERTIFICATE OF CORRECTION

PATENT NO. : 5,352,337
DATED : OCTOBER 4, 1994
INVENTOR(S) : KOBAYASHI ET AL

It is certified that error appears in the above-identified patent and that said Letters Patent is hereby corrected as shown below:

Column 14, line 34, after "of" should read --from 0.2 to 1,000 µm.--.

Signed and Sealed this

Twenty-eight Day of March, 1995

Attest:

BRUCE LEHMAN

Attesting Officer          Commissioner of Patents and Trademarks